United States Patent
Jameson

(10) Patent No.: US 8,056,686 B2
(45) Date of Patent: Nov. 15, 2011

(54) TORQUE CONVERTER WITH COVER PLATE DIRECTLY ATTACHED TO PISTON

(75) Inventor: Jonathan Jameson, Canton, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 710 days.

(21) Appl. No.: 12/217,783

(22) Filed: Jul. 9, 2008

(65) Prior Publication Data
US 2009/0014268 A1 Jan. 15, 2009

Related U.S. Application Data

(60) Provisional application No. 60/959,262, filed on Jul. 12, 2007.

(51) Int. Cl.
*F16H 45/02* (2006.01)
(52) U.S. Cl. ...................................... 192/3.29; 192/212
(58) Field of Classification Search .................. None
See application file for complete search history.

(56) References Cited

U.S. PATENT DOCUMENTS

| | | | |
|---|---|---|---|
| 4,027,757 A * | 6/1977 | Radke et al. .................. | 464/64.1 |
| 4,693,348 A | 9/1987 | Tsukamoto et al. | |
| 4,809,830 A * | 3/1989 | Schierling et al. ........... | 192/3.29 |
| 4,919,241 A * | 4/1990 | Koshimo ...................... | 192/3.29 |
| 5,020,647 A * | 6/1991 | Fujimoto et al. ............. | 192/3.29 |
| 5,308,282 A * | 5/1994 | Hansen et al. ............... | 464/67.1 |
| 5,737,836 A * | 4/1998 | Finn et al. .................... | 29/889.5 |
| 6,325,191 B1 | 12/2001 | Meisner et al. | |
| 6,615,962 B2 | 9/2003 | Back et al. | |
| 2003/0121743 A1* | 7/2003 | Kawamoto et al. .......... | 192/3.29 |
| 2007/0137962 A1* | 6/2007 | Sturgin et al. ................ | 192/3.29 |

* cited by examiner

*Primary Examiner* — Rodney Bonck
(74) *Attorney, Agent, or Firm* — Davidson, Davidson & Kappel, LLC

(57) ABSTRACT

A torque converter includes a turbine, a lockup clutch including a piston, and a damper having at least one cover plate, the cover plate being attached directly to piston. A method for assembling the torque converter includes passing a section of the piston through a hole in the cover plate and attaching the piston to the cover plate at the hole.

2 Claims, 3 Drawing Sheets

TORQUE CONVERTER WITH COVER PLATE DIRECTLY ATTACHED TO PISTON

Priority to U.S. Provisional Patent Application Ser. No. 60/959,262, filed Jul. 12, 2007, is claimed, the entire disclosure of which is hereby incorporated by reference herein.

The present invention relates generally to hydraulic torque converters, and more particularly to hydraulic torque converters having lockup clutches.

BACKGROUND OF THE INVENTION

U.S. Pat. Nos. 4,693,348, 6,325,191, and 6,615,962, hereby incorporated by reference herein, describe hydraulic torque converters with lockup clutches.

FIG. 1 shows an example prior art hydraulic torque converter 10 including a housing 12 non-rotatably connected to a crankshaft 14 to receive torque from an engine. Housing 12 has coaxial shells 16 and 18 secured and sealed together, for example welded. Attached to housing 12 is a pump 20 coaxial with and sharing the angular velocity of housing 12.

Enclosed in housing 12 are a turbine 22 rotatable with respect to housing 12 and a stator 24 installed between pump 20 and turbine 22. Turbine 22 is non-rotatably connected to a turbine hub 26, and turbine hub 26 is non-rotatably connected to input shaft 28 of a transmission, by splines 30. Stator 24 is mounted on a one-way clutch 32 connected by splines 34 to a hollow, non-rotating stator shaft 36.

Prior art torque converter 10 may further include a lockup clutch 38 capable of being engaged to transmit torque directly between housing 12 and turbine hub 26. This is accomplished by positioning a friction surface 40 of a piston 42 in contact with a friction surface 44 of housing 12. Piston 42 is moveable in both the circumferential and axial directions around turbine hub 26. Axial movement of piston 42 relative to turbine hub 26 may be accomplished by introducing a pressure difference between hydraulic fluid regions 45 and 46 on either axial side of piston 42.

Lockup clutch 38 may also have a torsional vibration damper 48 including a drive plate 50, cover plates 52, 54, a group of coil springs or other elastic energy storing devices 56, and rivets or spacer bolts 58. Drive plate 50 may be connected to piston 42 with splines or crenellations 60. Cover plates 52, 54 retain springs 56 and are held together with rivets or spacer bolts 58. Cover plates 52, 54 may be rigidly connected to turbine 22 and turbine hub 26. Relative circumferential motion between cover plates 52, 54 and drive plate 50 compresses or decompresses springs 56. Torsional damper 48 thereby isolates turbine hub 26 from torsional vibrations coming from, for example, crankshaft 14 or engine.

SUMMARY OF THE INVENTION

The present invention provides a torque converter comprising a turbine, a lockup clutch including a piston; and a damper having at least one cover plate, the cover plate being attached directly to piston.

The present invention also provides a method for assembling the torque converter comprising the steps of passing a section of the piston through a hole in the cover plate, and attaching the piston to the cover plate at the hole.

Figure 1:
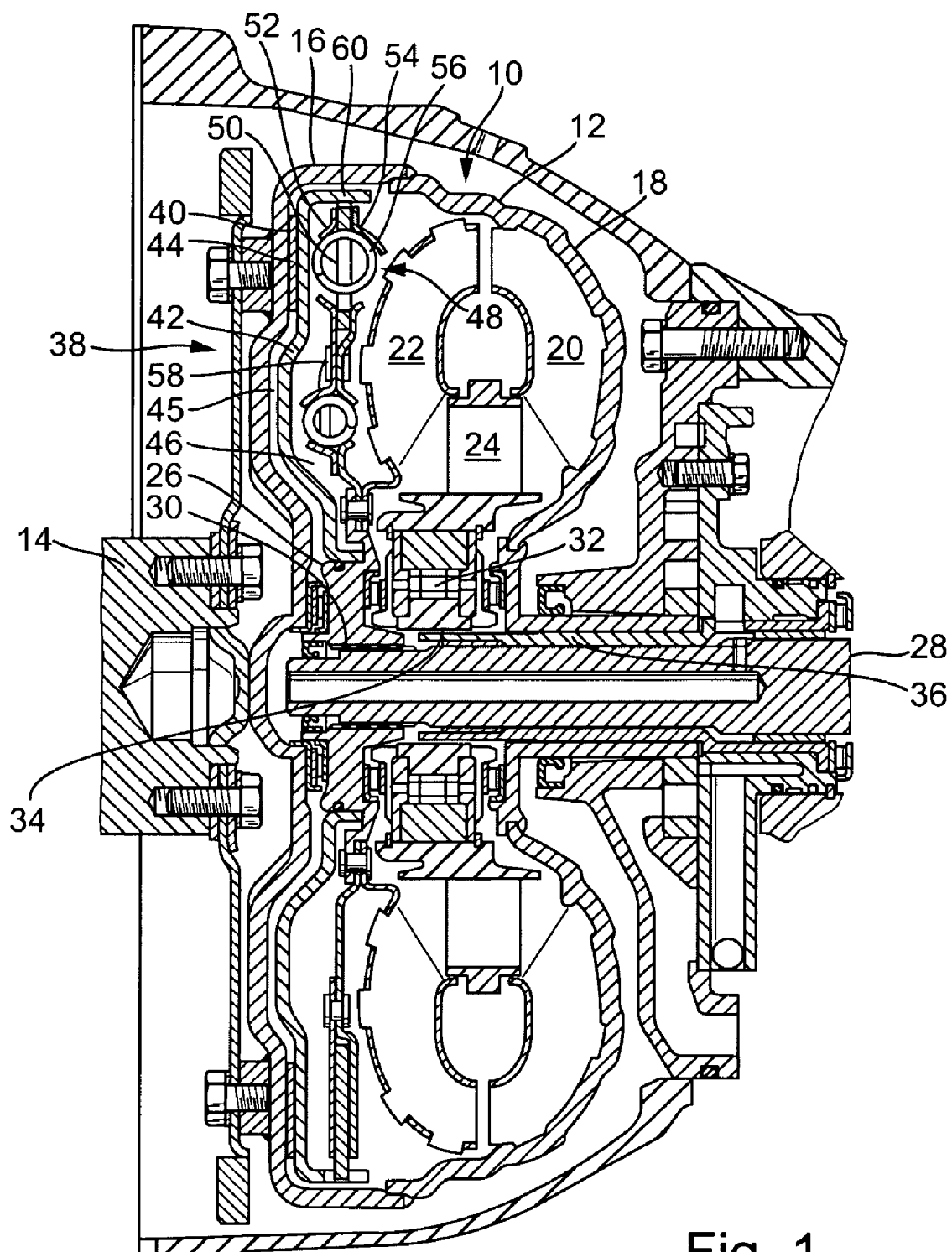
FIG. 1 is a cross-sectional view of a prior art hydraulic torque converter.
Figure 2:
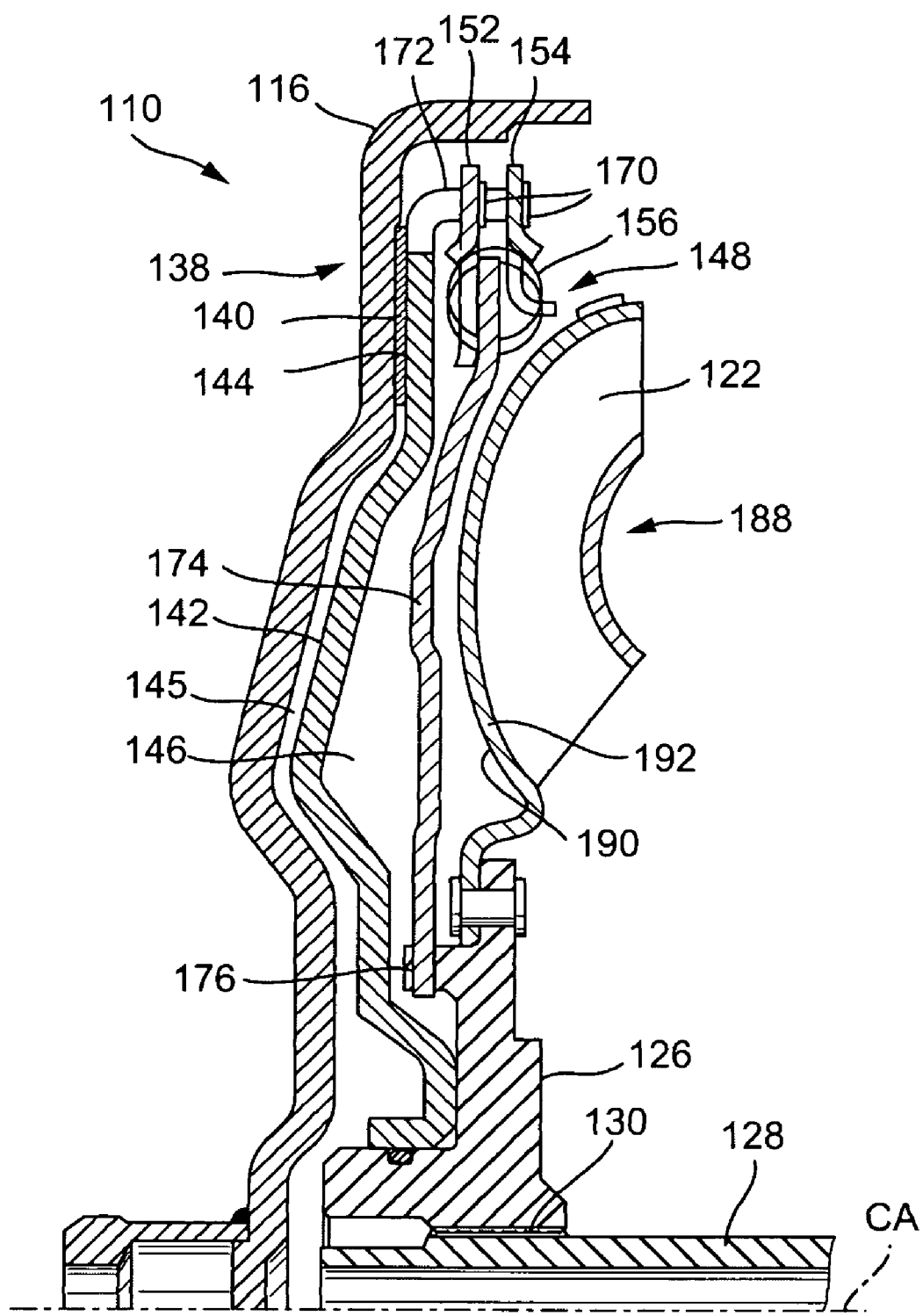

The present invention will be described further with respect to one embodiment using the figures, in which:

FIG. 2 is a sectional view of one embodiment of the present invention.

Figure 3:
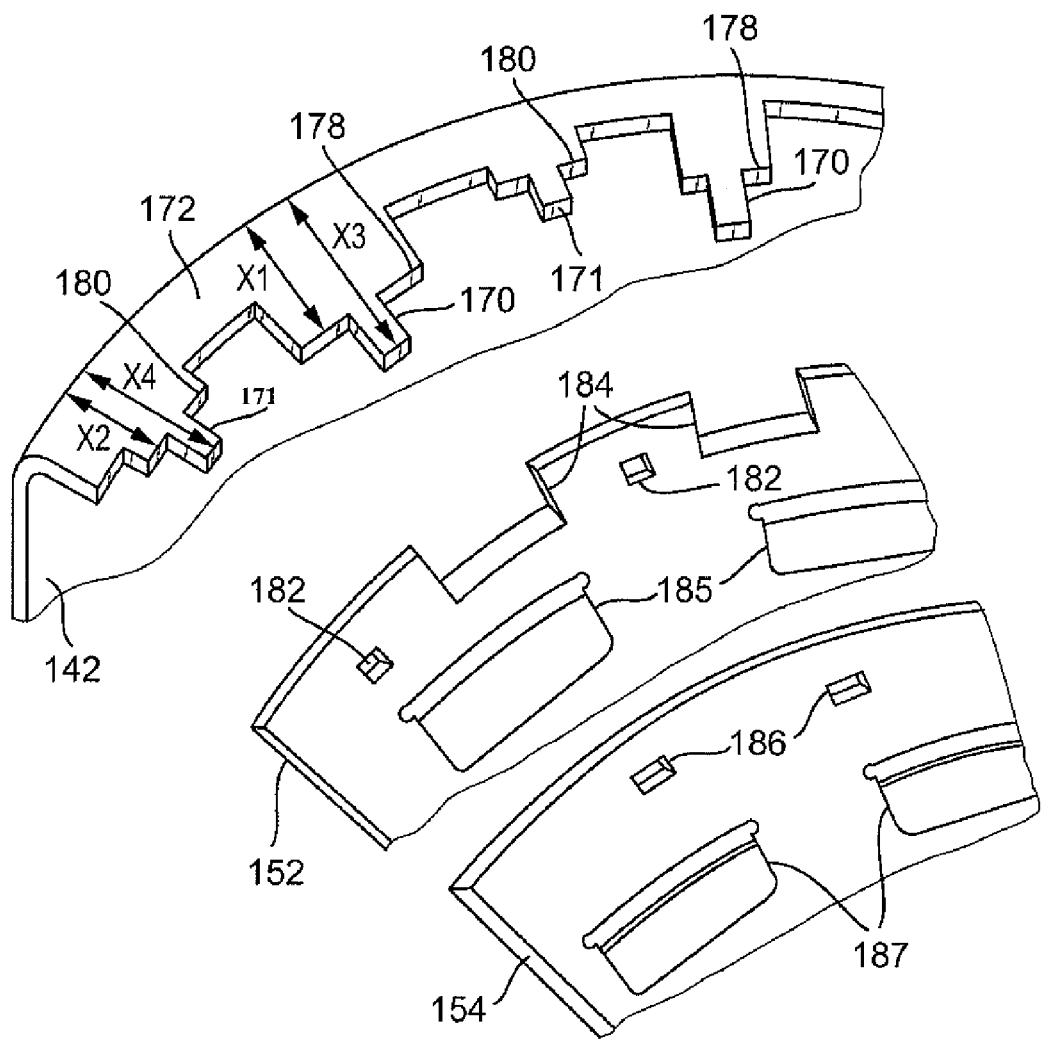

FIG. 3 is an exploded view of one embodiment of the present invention.

DETAILED DESCRIPTION

FIG. 2 shows a section of a torque converter 110 embodying the present invention. Torque converter 110 includes a housing shell 116 connected to a crankshaft of an engine. Inside housing shell 116 is a turbine 122 rigidly connected to a turbine hub 126. Turbine hub 126 is non-rotatably connected to an input shaft 128 of a transmission, for example, by splines 130. The engine may thus cause input shaft 128 to rotate about center axis CA.

Torque converter 110 further includes a lockup clutch 138 capable of being engaged to transmit torque directly between housing shell 116 and turbine hub 126. This engagement is accomplished by positioning a friction surface 140 of a piston 142 in contact with a friction surface 144 of housing shell 116. Piston 142 is moveable in both circumferential and axial directions around turbine hub 126. Axial movement of piston 142 relative to turbine hub 126 may be accomplished by introducing a pressure difference between hydraulic fluid regions 145 and 146 on either axial side of piston 142.

Lockup clutch 138 has a torsional vibration damper 148 for isolating turbine hub 126 from torsional vibrations caused by, for example, the crankshaft or engine. Damper 148 includes an array of coil springs or other elastic energy storing devices 156 and cover plates 152, 154 retaining the elastic energy storing devices 156. Cover plates 152, 154 are connected to piston 142 with rivets 170 extruded from outer circumferential surface 172 of piston 142. A flange 174 is non-rotatably connected to turbine hub 126 with, for example, splines 176. Relative motion between cover plates 152, 154 and flange 174 causes springs 156 to compress or decompress.

FIG. 3 shows schematically a section of outer portion of piston 142 (shown schematically as curved to indicate that it is annular) and cover plates 152, 154 prior to assembly. Outer surface 172 of piston 142 is stamped with a crenellated geometry having alternating shoulders 178 and 180, extending axial distances X1 and X2, respectively, from entirety of piston 142, where X1 is greater than X2. Extruded further in the axial direction are rivets 170 and 171, for example square in cross-section, attached to shoulders 178 and 180, respectively. Rivets 170 and 171 extend axial distances X3 and X4, respectively, from entirety of piston 142, where X3 is greater than X4. Distance X1 can lie between X2 and X4. Cover plates 152, 154 include cutouts 185, 187 to retain springs 156.

Cover plates 152, 154 contain holes 182, 186 and slots 184 to accommodate crenellated geometry and rivets 170, 171 of piston 142. Inner cover plate 152 contains holes 182 similar in cross-section to rivets 171, and slots 184 similar in cross section to shoulders 178. Inner cover plate 152 is assembled onto piston 142 so that rivets 171 on shoulders 180 pass through holes 182, and shoulders 178 pass through slots 184. Outer cover plate 154 contains holes 186 similar in cross-section to rivets 170. Outer cover plate 154 is assembled onto piston 142 so that rivets 170 on shoulders 178 pass through holes 186. Once cover plate 152 is properly seated onto piston 142, rivet 171 is coined to secure cover plate 152 in position. Next, cover plate 154 is seated onto piston 142, and rivet 170 is coined to secure cover plate 154 in position. Rivet 171 being coined before cover plate 154 is seated.

Attaching cover plates 152, 154 directly to piston 142 advantageously saves space for balancing turbine assembly 188, shown in FIG. 2. Turbine assembly 188 is typically balanced with a weight attached to the outer surface 190 of turbine shell 192. Because this weight typically is assembled perpendicular to turbine shell 192, prior art dampers, for example 48, can interfere with the desired placement of the weight. By attaching cover plates 152, 154 directly to piston 142 with rivets 170, 171, the interference issue between damper 48 and balancing weight advantageously can be avoided.

Attaching cover plates 152, 154 directly to piston 142 also advantageously avoids the use of separate rivets or spacerbolts, for example 58, to hold cover plates 152, 154 together. In some instances, there is not enough radial room for a rivet or spacerbolt to be positioned in a desirable location, often radially outward from springs 56. By fixing cover plates 152, 154 directly to piston 142, separate rivets or spacerbolts are advantageously not needed, saving additional space.

What is claimed is:

1. A torque converter comprising:
   a turbine;
   a lockup clutch including a piston; and
   a damper having at least one cover plate, the cover plate being attached directly to the piston
   wherein the piston has an axially extending rivet and the cover plate has a hole, the rivet passing through the hole,
   wherein the damper includes a second cover plate also attached directly to the piston,
   wherein the piston has a plurality of axially extending rivets, a first rivet extending axially a first distance, and a second rivet extending axially a second distance, the first distance being larger than the second distance,
   wherein the first cover plate has a first hole accepting the first rivet and the second cover plate has a second hole accepting the second rivet,
   wherein the second cover plate has a first slot, the first rivet passing through the first slot.

2. The torque converter as recited in claim 1 wherein the first rivet extends from a first shoulder, the first shoulder fitting in the first slot.

\* \* \* \* \*